United States Patent [19]

Brisbois

[11] Patent Number: 5,690,285
[45] Date of Patent: Nov. 25, 1997

[54] LINING ELEMENTS FOR A ROTARY MILL AND MILL EQUIPPED WITH SUCH ELEMENTS

[75] Inventor: Jean-Marie Brisbois, Dion-le-Mont, Belgium

[73] Assignee: Slegten Societe Anonyme, Louvain-La-Nueve, Belgium

[21] Appl. No.: 666,578

[22] PCT Filed: Dec. 21, 1994

[86] PCT No.: PCT/EP94/04266

§ 371 Date: Oct. 4, 1996

§ 102(e) Date: Oct. 4, 1996

[87] PCT Pub. No.: WO95/17968

PCT Pub. Date: Jul. 6, 1995

[30] Foreign Application Priority Data

Dec. 29, 1993 [BE] Belgium ............... 9301481

[51] Int. Cl.⁶ .................................. B02C 17/22
[52] U.S. Cl. .......................... 241/172; 241/183
[58] Field of Search ................ 241/172, 183, 241/182

[56] References Cited

U.S. PATENT DOCUMENTS

| | | | |
|---|---|---|---|
| 2,801,804 | 8/1957 | Frankert | 241/183 |
| 3,467,321 | 9/1969 | Tkachev et al. | 241/183 |
| 3,630,459 | 12/1971 | Slegten | 241/183 |
| 3,677,479 | 7/1972 | Slegten | 241/183 |
| 4,200,242 | 4/1980 | Ueda | 241/183 |
| 4,211,370 | 7/1980 | Wilson | 241/183 |
| 4,289,279 | 9/1981 | Brandt | 241/102 |
| 4,736,894 | 4/1988 | Ferrada et al. | 241/30 |

FOREIGN PATENT DOCUMENTS

| | | |
|---|---|---|
| 2054238 | 4/1971 | France. |
| 2213808 | 8/1974 | France. |
| 1 161 110 | 1/1964 | Germany. |
| 1 284 053 | 8/1972 | United Kingdom. |

Primary Examiner—John M. Husar
Attorney, Agent, or Firm—Jacobson, Price, Holman & Stern, PLLC

[57] ABSTRACT

A lining member for a rotary grinder in the shell of which the member forms a series of corrugated cylindrical surfaces intersected by rings defined by transverse projections (12) on the lining members. The corrugations on each member are at an angle to the shell generatrix along at least a part of the length of the member. The member is suitable for grinders in cement works or the mining industry.

5 Claims, 2 Drawing Sheets

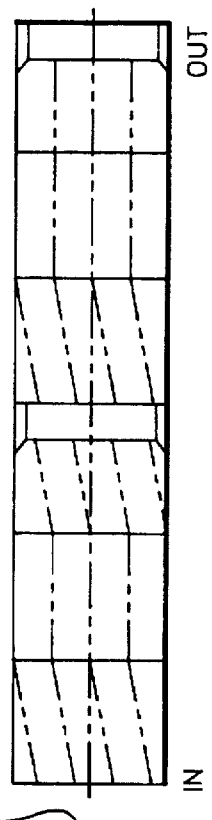
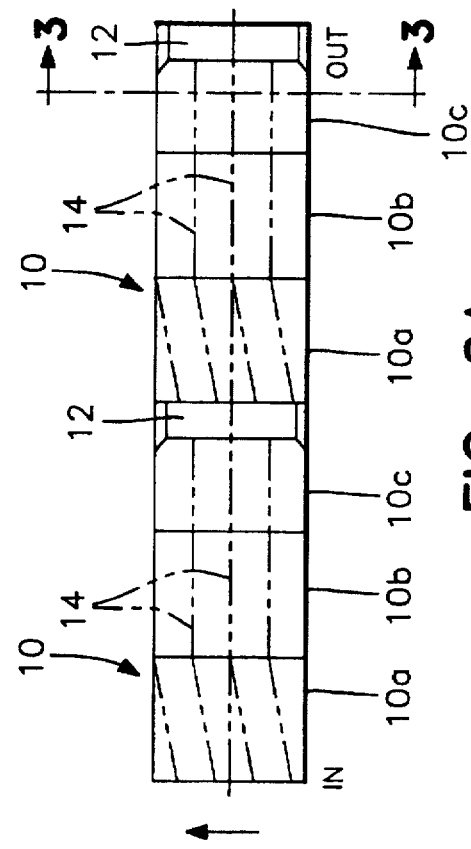
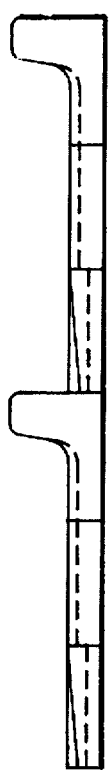
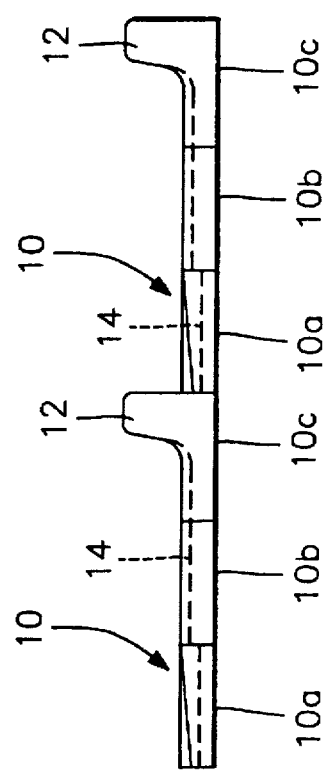

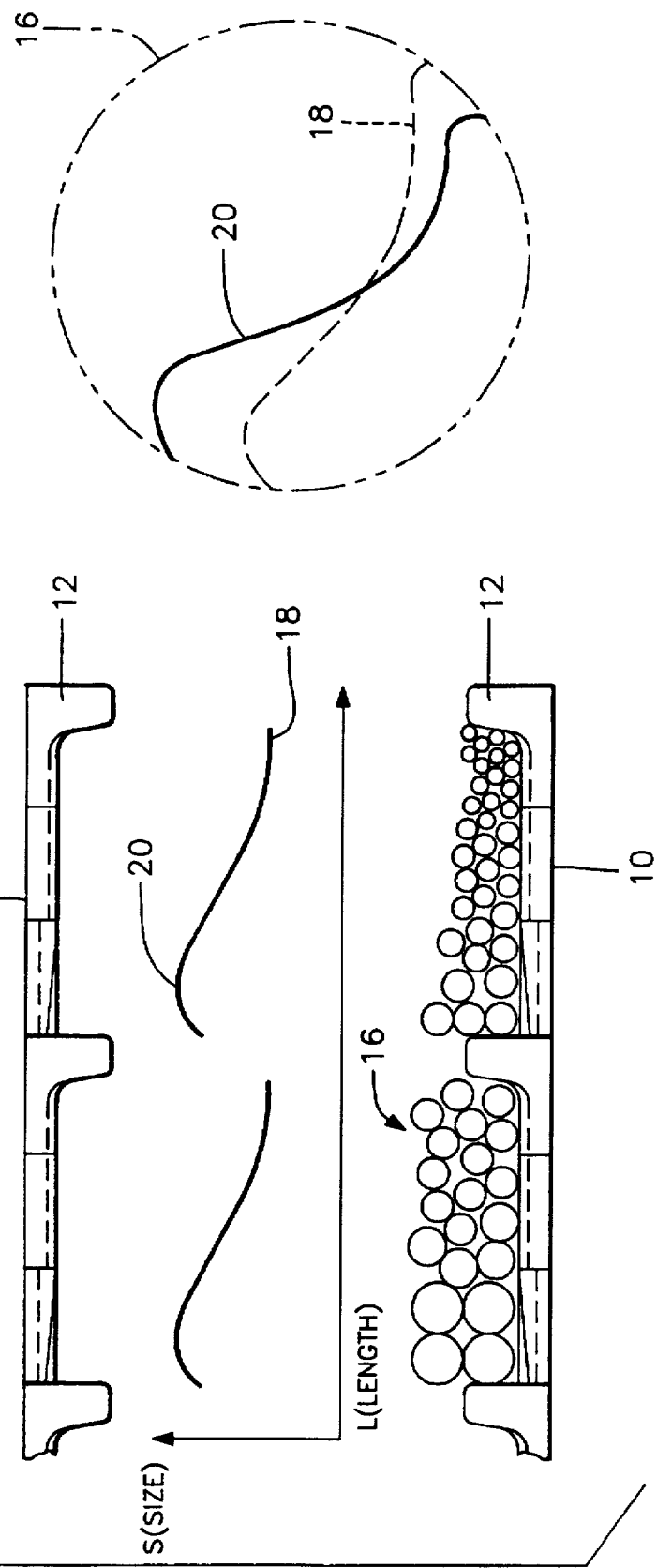

LINING ELEMENTS FOR A ROTARY MILL AND MILL EQUIPPED WITH SUCH ELEMENTS

SUBJECT OF THE INVENTION

The present invention relates to a lining element intended to be part of the lining of the internal wall of the shell of a rotary mill. The latter is filled with grinding media. The lining element shows a smooth and cylindrical face on the lower or external side for matching the internal surface of the shell and a cylindrical face on the upper or external side. The invention also relates to a rotary mill that includes a cylindrical shell, the internal lining of which consists of such element.

STATE OF THE PRIOR ART

The invention relates at the same time to the mills for the wet process as to the mills for the dry process, specially those used in the cement or mining industry for crushing and grinding clinker, cement raw materials or ores. These mills consist of a cylindrical shell rotating around its longitudinal axis and containing a grinding charge made of grinding media, generally balls, but that can also be cylpebs, boulpebs or other media of different sizes. The material to be ground is introduced at one side of the mill and is ground and crushed between the grinding media, as it progresses towards the outlet, on the opposite side.

Given that the grinding occurs progressively throughout the mill, in the direction of throughput, the best grinding conditions are achieved when the size of the grinding media matches that of the material to be ground. In other words, the coarsest grinding media should preferably, be concentrated on the inlet side of the mill, whereas the smallest ones should be grouped together on the outlet side. This is known as the classification of the grinding media according to their size. Under optimum conditions, this classification should therefore be achieved automatically during the operation of the mill.

In order to achieve that classification, it is known to provide linings consisting of plates, the internal surface of which creates, in the mill, a succession of volumes in the shape of a truncated cone flared towards the inlet of the mill. In other words, the lining offers, in longitudinal cross-section, a saw-toothed profile. These inclined surfaces tend to push back the coarsest grinding media towards the inlet of the mill and, as a consequence, the smallest media towards the outlet. As a consequence, the size of the grinding media decreases as the fineness of the material to be ground increases.

By virtue of this classification of the grinding bodies in the mills, a reduction in the energy consumption in the range of 11 to 15% is achieved, which nowadays is significant.

Patent FR-A-2213808 already presents the idea of classifying the media by using a plate the shape of which offers undulations that make an angle with the generatrix of the mill. However, this patent necessarily combines the said undulations plate with another plate showing an external surface in the shape of a truncated cone. This means that the well-known principle of volumes in the shape of a truncated cone remains the basis of the classification for that patent.

Patent DE-B-1161110 describes a flat and undulated plate. However, this plate tries to recreate the shape of a truncated cone by having undulations of decreasing depth in the same plate. Moreover, the same patent does not mention the possibility of designing the undulations so that they show an angle with the generatrix of the mill. One should add that if the document in question also describes a transversal element, the latter offers a height that does not go above the maximum height of the undulations. That transversal element tends to reduce the tendency of the material of going back towards the inlet of the mill. It does not contribute to the classification, as indicated in col. 3, lines 13 ff.

Patent FR-A-2054238 mentions a "ring". However, the main purpose of the said ring is to slow down the speed at which the material proceeds towards the outlet while not disturbing the classification effect of the lining among which that ring is installed. It is true that, incidentally, imperfect classification can be reached by the same ring if combined with plates "showing parallel or oblique undulations with reference to the mill axis or including any roughness or hollow parts able of inducing the appropriate lifting". One should note that the diameter of the said ring is equal to 18 to 20% of the internal diameter of the mill. That ring is therefore essentially aimed at slowing down the material rather than at classifying. It is also clearly indicated that the undulations are present to contribute to the lifting and not to the classification.

Another type of hollow ring is mentioned by patent GB-A-1,284,053. However, the purpose of that ring is also to lift the material by using a structure that is light and wear resistant. Classification is nowhere mentioned in that document.

Consequently, all linings that use undulations in the plates to achieve the classification, always refer to a surface in the shape of a truncated cone. That shape presents major drawbacks, one of them being the thickness of the lining that such shape makes necessary.

Another even more important problem is the volume taken inside the mill shell by a lining in the shape of a truncated cone. The thicker it is, the more the useful volume, that is the volume that is free for the material to be ground and the grinding media, is small. Such a drawback makes impossible to use linings presenting surfaces with the shapes of a truncated cone in certain mills. Certain mills use liners that are flat and offer a high lifting effect while not classifying. Because of the large useful volume and the important lifting, these mills pull a lot of power. If a liner presenting a surface in the shape of a truncated cone is installed, the efficiency of the mill will be improved. However, the useful volume is also reduced. As a consequence, the mill is loaded with a smaller quantity of grinding media. Since the mill must move a smaller quantity of grinding media, the pulled power is reduced. Moreover, such a liner increases the slipping and its lifting effect compared to the flat liner is smaller. This is another reason to further reduce the pulled power. For instance, one can consider that replacing a flat liner with a classifying liner having a surface in the shape of a truncated cone improves the efficiency by 13%. The pulled power will be reduced by 18%. In that case, the mill output will be reduced by 5%. In certain cases, it is necessary to keep the maximum possible output of the grinding circuit. Therefore, it is impossible to use a liner with a surface in the shape of a truncated cone.

This problem is specially common in the mills used in North America.

PURPOSE OF THE INVENTION

The purpose of the present invention is to propose a lining that classifies while offering the same useful volume as the flat liners.

The present invention aims at proposing a liner that enables to keep the same pulled power as the one used by a flat liner while offering an improvement in efficiency. As a consequence, the latter could be fully converted into an increase in output.

The present invention aims at proposing to the industry a classifying liner that offers a significant economical advantage.

PRINCIPAL CHARACTERISTIC ELEMENTS OF THE INVENTION

In order to achieve that target, one proposes a lining element intended to form part of the lining protecting the internal wall of the shell of a rotary mill, partially filled with grinding media, the external side of said lining being smooth and cylindrical in order to match the shape of the internal surface of the shell, the internal side of said lining being cylindrical and presenting, on at least one portion of its length, longitudinal undulations (14), said undulations being, on at least one longitudinal section of the liner, inclined with reference to the generatrix of the mill and its direction of rotation, characterised in that the said internal cylindrical side does not induce any volume in the shape of a truncated cone and that it shows a transverse radial nose (12), projecting in relation to the rest of the internal face and the height of which is smaller than 10% of the mill diameter.

In known inclined-surface mills, there is selective migrations of the grinding media which, depending on their size, are driven back to a greater or lesser extent towards the inlet of the mill under the action of the inclined surfaces and of the different weight of the grinding media. The present invention is based on the combined effect of the inclined waves and of the transverse radial nose which causes, depending on the size of the media, selective migration of the latter respectively towards the inlet and the outlet of the mill. In other words, although in the known mills, the intention is to have natural segregation of the grinding media along the inclined surfaces, the inclination of the undulations of the liners according to the present invention cause a forced segregation of the grinding media according to their size, which results in a better classification. Furthermore the absence of volumes in the shape of a truncated cone increases the useful volume of the mill and reduces the weight.

The lining element preferably includes, in the length direction, three sections. The first one is provided with undulations inclined with reference to the generatrix of the mill. The second one is provided with undulations parallel to the generatrix of the mill. The third one is provided with undulations parallel or inclined in relation to the generatrix of the mill, said undulations extending as far as to the transverse nose.

According to a preferred embodiment of the invention, the horizontal undulations may have a different depth, the ones of the second and third section having the same depth while the ones of the first section being deeper. Within each section, the depth of the undulations remains the same.

The transverse nose preferably has a trapezoidal cross-section, the face turned towards the inlet of the mill being slightly inclined in relation to a diametrical plane of the mill.

The rear face of the transverse nose which is turned towards the outlet of the mill may also include undulations.

The invention also provides for a rotary mill comprising a cylindrical shell lined with an inner lining characterised in that said lining consists, over at least one part of the length of the mill, of lining elements such as described hereinabove and has a succession of undulated cylindrical surfaces intersected by rings formed by the said transverse noses of the lining elements.

Other features and characteristics of the invention will emerge from the detailed description of two preferred embodiments given herein-below, as examples, with reference to the enclosed drawings.

BRIEF DESCRIPTION OF THE FIGURES

FIGS. 1a and 2a represent respectively plan and longitudinal cross-section views of a first embodiment of lining elements according to the present invention.

FIGS. 1b and 2b represent similar views of a second embodiment of lining elements according to the present invention.

FIG. 3 represents diagrammatically a transverse cross-section according to view III—III of FIG. 1a.

FIG. 4 represents diagrammatically a longitudinal cross-section of a linings of mills, consisting of lining elements according to the present invention.

FIG. 4a illustrates diagrammatically, by a transverse cross-section of the mill, the contents of the latter.

DESCRIPTION OF A PREFERRED EMBODIMENT OF THE INVENTION

FIGS. 1a and 2a each show two lining elements 10 made of steel, alloy cast iron, or indeed made of rubber or resin. These elements 10 are formed by elongate rectangular plates which are slightly arched, as shown in FIG. 3, with a smooth external face for matching the cylindrical shape of the shell of the mill, of which they are the internal lining. These elements may be bolted to the shell or simply be wedged against each other and be, thereby, held in place by a vault effect.

Each element has, on the outlet side of the mill, a transverse nose 12 projecting in relation to the rest of the elements. Combined with the noses of the other elements of the same crown in the mill, said noses create circular rings. As a consequence, the lining assembly made by the longitudinal and circumferential juxtaposition of these elements 10 creates a succession of cylindrical surfaces intersected by rings formed by the noses 12.

The height of the rings made by the succession of the transverse noses 12 in projection, must be inferior to 10% of the internal diameter of the mill. As examples, let us say a height of 150 mm for a 2 m diameter mill and 300 mm for a 5 m diameter mill.

According to one aspect of the present invention, each element 10 includes, on its internal face, undulations 14 extending from the very inlet side of the mill as far as to the nose 12. These undulations are indicated by the broken lines on FIGS. 1a and 2a and more visibly on FIG. 3.

Each element 10 preferably includes, in the longitudinal direction, three sections 10a, 10b and 10c. Each of these sections may consist of a separate plate, or alternatively, the entire element 10 may be made of one single plate, the three sections being defined by the shape of the undulations 14.

The undulations 14 of section 10a, on the inlet side, are inclined in relation to the longitudinal direction or the generatrix of the shell. The direction of the inclination of the undulations 14 in relation to the direction of rotation of the mill, illustrated by arrow 15, is always such that the outlet side of an undulation precedes, in the direction of rotation, the inlet side of the same undulation. Due to the combined effect of the radial nose and of the inclination of the waves, the undulations tend, during the rotation, to drive back the grinding media in the direction of the inlet of the mill.

Since that effect is the more important as the size of the grinding media increases, an automatic segregation occurs while the mill rotates, by migration of the grinding media towards the inlet of the mill.

The angle of inclination of the undulations of the section 10a in relation to the generatrix of the mill will be chosen according to the depth of the waves, the size of the grinding media and the characteristics of the mill, especially its diameter and its speed of rotation. In practice, the angle of inclination may vary between 10° and 45°. Too small an angle of inclination may give rise to insufficient classification of the grinding media, whereas too wide an angle may impede the progression of the material to be ground and may cause an undesirable accumulation of the ball load on the inlet side.

In order to achieve a good compromise between these two extremes, it is preferable for the undulations of the central section 10b not to be inclined, and therefore to be parallel to the generatrix. Indeed, it should not be forgotten that the undulations 14 also contribute to the lifting of the ball load. This is essential in order to induce a good mixing for the crushing and grinding of the material.

In that context, and depending on the characteristics of the mill and of its ball load, undulations 14 of the third section 10c in front of the nose 12 may be rectilinear, as in FIG. 1a, or be slightly inclined as shown on FIG. 1b, the inclination being directed in the same direction as that of the undulations of the prior section 10a. In any case, the inclination of the undulations of section 10c will be less pronounced than that of section 10a and will generally not exceed 10°.

According to a preferred embodiment of the invention, the depth of the undulations may also vary from one section to the other of a lining element 10. The choice of the depth of undulations 14 will be determined by taking into account the fact that that depth essentially contributes to the lifting of the ball load. Sections 10b and 10c will preferably have the same depth (for instance, 20 mm) and section 10a will have deeper undulations than the two previous sections (for instance, 40 mm).

As may be realised from the figures, the rings made by the noses 12 of the lining elements 10 preferably have a slightly trapezoidal cross-section, in the sense that their face turned towards the inlet of the mill is slightly inclined. The face of the rings which is turned towards the outlet of the mill is located in a diametral plane and is, either smooth or shows undulations extending the longitudinal undulations of the adjacent lining element in the radial direction. The height of the ring will be determined as a function of the diameter of the mill and of the size of the grinding media. The longitudinal separation of the rings, that is to say the length of the lining elements 10, depends on the diameter of the mill and on its filling coefficient.

FIGS. 4 and 4a illustrate diagrammatically the classification of the grinding elements and their lifting by the rotation of the mill. As shown in FIG. 4, the size (S) of the grinding balls decreases progressively along the length (L) of the mill, from the inlet of the mill towards the outlet, to the right.

FIG. 4a illustrates diagrammatically, by the dot-dash lines 16, the internal volume of the mill. The broken-line profile 18 illustrates the level of the load upstream of the rings, seen in the direction of the progression of the material, whereas the solid-line profile 20 illustrates the profile of the load downstream of the rings. One sees that section 10a of each lining induces a higher lifting of the load in its neighbourhood than section 10c in its own area. This is due, on the one hand, to the inclination of the undulations and, on the other hand, to the wedge effect, occurring in the region of the rear face of the rings, part of the prior section 10c. The lifting effect can be reinforced by the undulations that can be found on the rear face of the rings.

This variable lifting over the length of the mill is favourable to grinding. During the rotation of the mill, shearing occurs, in diametral planes, between the different layers of grinding media and of the material to be ground, which improves the grinding efficiency.

The lining elements, as described here-above, may line the entire surface of the shell. However, in order to further decrease the weight of the mill, it is possible to provide the inlet zone with cylindrical elements deprived from transverse noses, which means not having annular rings in that area.

I claim:

1. A lining element for placement within a rotary mill which is partially filled with grinding media, to protect an internal wall of the rotary mill, said lining element comprising:
   a substantially cylindrical outer surface for placement against said internal wall of the rotary mill;
   a substantially cylindrical internal side; and
   a nose element having first and second surfaces facing toward respective longitudinal ends of said lining element, said nose element being arranged so as to project radially inwardly from said internal side in such an abrupt manner that said first and second surfaces are generally perpendicular to said internal side and, at most, are only slightly inclined with respect to a diametrical plane;
   said nose element having a peak located at a distance from said internal side, said distance being smaller than 10% of a diameter defined by said cylindrical outer surface;
   said substantially cylindrical internal side having longitudinal undulations arranged along at least a portion of the length of said lining element, said longitudinal undulations being at an angle with respect to a longitudinal axis of said lining element for at least a section of said portion.

2. The lining element of claim 1, wherein said lining element includes first, second, and third sections disposed successively along the length of said lining element, said first section having said longitudinal undulations arranged at said angle with respect to the longitudinal axis, said second section having said longitudinal undulations arranged parallel with said longitudinal axis, and said third section having said longitudinal undulations arranged substantially parallel with said longitudinal axis and extending up to said nose element.

3. The lining element of claim 1, wherein said lining element includes first, second, and third sections disposed successively along the length of said lining element, said first section having said longitudinal undulations arranged at said angle with respect to the longitudinal axis, said second section having said longitudinal undulations arranged parallel with said longitudinal axis, and said third section having said longitudinal undulations inclined with respect to said longitudinal axis and extending up to said nose element.

4. The lining element of claim 1, wherein said longitudinal undulations have a first constant depth in said section and a second constant depth outside of said section, the first constant depth inside of said section being deeper than the second constant depth outside of said section.

5. A rotary mill comprising:
   a shell which is partially filled with grinding media, and
   a lining element located on an internal wall of the shell, for protecting the internal wall of the shell from the grinding media, said lining element comprising:

a substantially cylindrical outer surface for placement against said internal wall of the rotary mill;

a substantially cylindrical internal side; and a nose element having first and second surfaces facing toward respective longitudinal ends of said lining element, said nose element being arranged so as to project radially inwardly from said internal side in such an abrupt manner that said first and second surfaces are generally perpendicular to said internal side and, at most, are only slightly inclined with respect to a diametrical plane;

said nose element having a peak located at a distance from said internal side, said distance being smaller than 10% of a diameter defined by said cylindrical outer surface;

said substantially cylindrical internal side having longitudinal undulations arranged along at least a portion of the length of said lining element, said longitudinal undulations being at an angle with respect to a longitudinal axis of said lining element for at least a section of said portion.

\* \* \* \* \*